Dec. 8, 1925.

G. H. PHELPS 1,564,892

ELECTRIC WELDING APPARATUS

Filed Jan. 2, 1925

Inventor
George H. Phelps.
By His Attorney

Patented Dec. 8, 1925.

1,564,892

UNITED STATES PATENT OFFICE.

GEORGE H. PHELPS, OF WAREHOUSE POINT, CONNECTICUT, ASSIGNOR TO THOMAS E. MURRAY, OF BROOKLYN, NEW YORK.

ELECTRIC WELDING APPARATUS.

Application filed January 2, 1925. Serial No. 82.

*To all whom it may concern:*

Be it known that I, GEORGE H. PHELPS, a citizen of the United States, and resident of Warehouse Point, Connecticut, have invented certain new and useful Improvements in Electric Welding Apparatus, of which the following is a specification.

In my application 732,768, I have described a method of welding the edge of a fin of flange to the surface of a tube to produce a heat conducting tube having certain advantages in specially constructed boilers.

My present application provides an apparatus to be used in carrying out the process of my previous application and analogous processes.

The accompanying drawings illustrate an embodiment of the invention.

Referring to the case illustrated, the tube 1 is of steel tubing such as is ordinarily used for boiler tubes, either seamless or made with a welded seam. A plate 2 is to be applied to form a fin on the tube. The joint edge of the plate is preferably tapered. The parts are pressed together, commencing with a light pressure and afterwards increasing it, while a welding current is passed across the joint. Preferably a current of extremely high ampere strength is applied for a very brief regulated period of time, as in the Murray Reissue Patent 15,466 of October 10, 1922. During the initial light pressure an arc is formed raising the parts to a welding heat in spite of the comparatively rapid loss of heat by conduction through the metal of the tube. The continued pressure is sufficient to squeeze out all the burned or melted metal and finally to form a good weld.

Where the tube is sufficiently thick, it will resist the pressure and practically maintain its shape in spite of being softened locally by the heat. But for thin tubes and where bending thereof would be objectionable, it is advisable to use a backing or mandrel.

Figure 1:
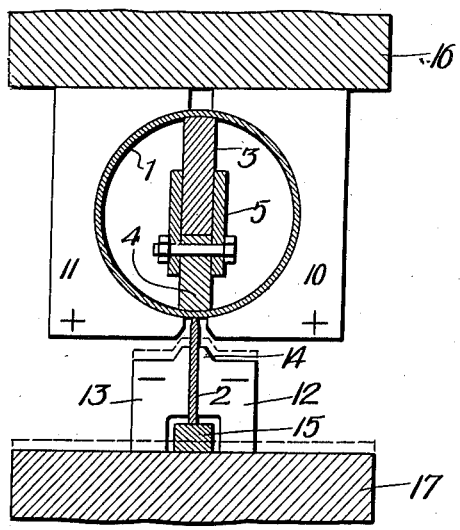
Fig. 1 is a cross-section.
Figure 2:
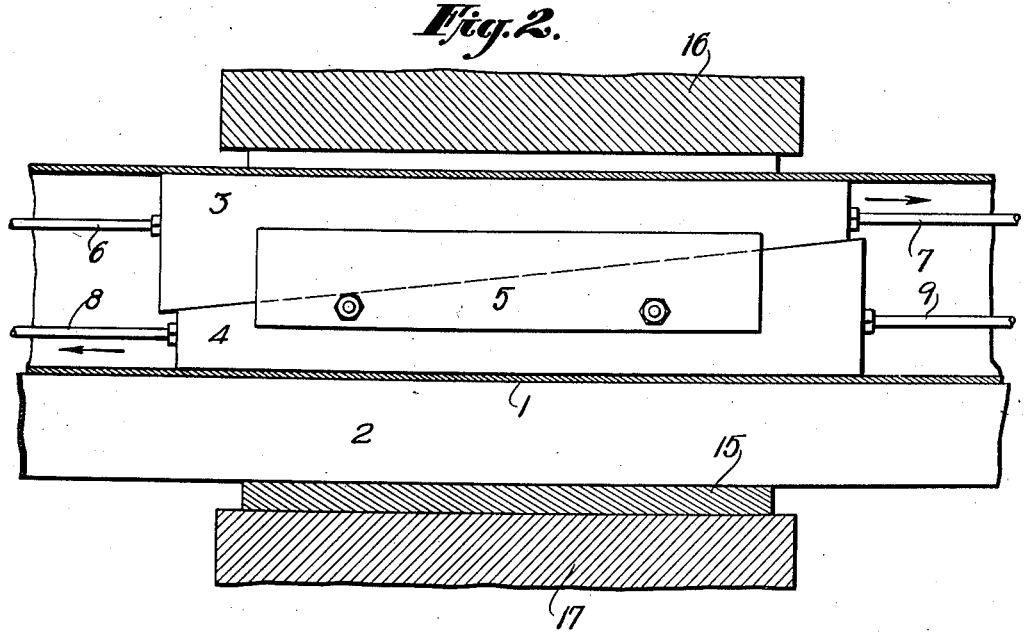
Fig. 2 is a longitudinal section approximately central.

Such a mandrel is shown in the present drawings composed of two principal parts 3 and 4 in the shape of wedges. The part 4 has a pair of plates 5 fastened to its opposite faces to serve as guides for the part 3. Rods 6 and 7 serve to pull the wedge 3 in one direction or the other, and rods 8 and 9 serve the same purpose for the wedge 4. The outer edges of the wedges are shaped to fit the inner face of the tube. When the wedges are shifted in the direction of the arrows, Fig. 2, they fill the tube and serve to support it against distortion in the welding operation. When the welding operation is completed, the wedges are pulled in opposite directions sufficiently to contract the mandrel as a whole and to shift it to another point in the length of the tube. For tubes of considerable length, the welding will be done in successive operations along the length of the tube, the tube being moved step by step longitudinally through the machine for this purpose.

One of the electrodes may be made in two parts 10 and 11 which fit the tube around nearly its entire periphery, with a narrow gap at one side for the fin and a similar gap at the opposite side. The opposite electrode may also be made in two parts 12 and 13 between which the fin is clamped for nearly its entire width, this electrode having a projecting part 14 adapted to enter the gap between the parts of the opposite electrode. A supporting bar 15 is arranged against the rear edge of the plate. The upper electrode is located on the underside of a head 16 of the machine, and the lower electrode on the top of an opposite head 17. In welding, either head the machine is moved toward the other while the current is passing. Assuming that it is the lower head which is moved, the parts thereof will be advanced to the positions shown in dotted lines, the parts 14 of the lower electrode entering the gap between the parts of the upper electrode as illustrated. Either electrode may be arranged above the other, or they may be arranged horizontally; and the machine may be completed in detail in various known ways.

It is desirable to have the lower gap between the parts 10 and 11, narrow so that the current will not have to travel far to the point where the joint is to be made. It is also desirable that the parts 12 and 13 of the lower electrode shall extend close to the edge where the joint is to be made. It is thus advantageous to have the lower electrode shaped so as to enter the gap in the upper one. The mandrel, it will be observed, is arranged to extend across and beyond the sides of the gaps between the parts of the tube-holding electrode.

The apparatus may be used for welding fins such as are described in my previous application, or for welding copper fins to tubes as described in a co-pending application of Thomas E. Murray, Jr. and generally for welding projections to tubes.

Though I have described with great particularity of detail an embodiment of my invention, yet it is not to be understood therefrom that the invention is restricted to the particular embodiment illustrated. Various modifications thereof may be made by those skilled in the art without departure from the invention as defined in the following claims.

What I claim is:

1. An apparatus of the character described comprising an electrode in two parts adapted to embrace a tube, with a gap at a determined point and a second electrode adapted to be clamped to a projecting member with its edge inserted in said gap against the tube.

2. An apparatus of the character described comprising an electrode in two parts adapted to embrace a tube, with a gap at a determined point and a second electrode adapted to be clamped to a projecting member with its edge inserted in said gap against the tube, in combination with a supporting device located within the tube to hold the latter in shape against the pressure of said projecting member during the welding operation.

3. An apparatus of the character described comprising an electrode in two parts adapted to embrace a tube, with a gap at a determined point and a second electrode adapted to be clamped to a projecting member with its edge inserted in said gap against the tube, the latter electrode being adapted to enter in part into said gap.

4. An apparatus of the character described comprising an electrode in two parts adapted to embrace a tube, with a gap at a determined point and a second electrode adapted to be clamped to a projecting member with its edge inserted in said gap against the tube, in combination with a supporting device located within the tube to hold the latter in shape against the pressure of said projecting member during the welding operation, and supporting means for the outer edge of said projecting member during the welding operation.

5. An apparatus of the character described comprising an electrode adapted to embrace a tube, with a gap at a determined point and a second electrode adapted to be clamped to a projecting member with its edge inserted in said gap against the tube.

6. An apparatus of the character described comprising an electrode adapted to embrace a tube, with a gap at a determined point and a second electrode adapted to be clamped to a projecting member with its edge inserted in said gap against the tube, in combination with a supporting device located within the tube to hold the latter in shape against the pressure of said projecting member during the welding operation.

In witness whereof, I have hereunto signed my name.

GEORGE H. PHELPS.